United States Patent [19]
Motoyanagi

[11] Patent Number: 5,182,655
[45] Date of Patent: Jan. 26, 1993

[54] FACSIMILE APPARATUS HAVING A RECHARGEABLE BATTERY

[75] Inventor: Teruo Motoyanagi, Hino, Japan

[73] Assignee: Kabushiki Kaisha Toshiba, Kawasaki, Japan

[21] Appl. No.: 744,106

[22] Filed: Aug. 13, 1991

[30] Foreign Application Priority Data

Aug. 20, 1990 [JP] Japan .................................. 2-217171

[51] Int. Cl.⁵ .............................................. H04N 1/00
[52] U.S. Cl. ................................... 358/406; 340/636; 358/400
[58] Field of Search ............... 358/406, 473, 400, 404, 358/444; 340/636

[56]  References Cited
U.S. PATENT DOCUMENTS

| | | | |
|---|---|---|---|
| 4,743,831 | 5/1988 | Young | 340/636 |
| 4,819,083 | 4/1989 | Kawai et al. | 358/473 |
| 4,823,376 | 4/1989 | Takahashi | 358/400 |
| 4,975,783 | 12/1990 | Takaoka | 358/404 |

FOREIGN PATENT DOCUMENTS 0064957  4/1984  Japan .................................. 358/444

OTHER PUBLICATIONS

Abstract of 63-14540; Jan. 21, 1988; Takahashi.

Primary Examiner—Edward L. Coles, Sr.
Assistant Examiner—Jill Jackson
Attorney, Agent, or Firm—Finnegan, Henderson, Farabow, Garrett and Dunner

[57]  ABSTRACT

A facsimile apparatus capable of informing an operator of data such as operable time of the facsimile apparatus, the number of documents transmittable and receivable based on the quantity of electric charges remaining in the battery comprises a clock for generating time data and a monitor for monitoring the quantity of electric charges remaining in the battery. The monitor calculates the charging time of the battery based on the time data. The charged quantity of the battery from the time when the battery started to be charged to the current time is determined from the charging time. The operation time of the facsimile apparatus driven by the battery in each of the operation modes is calculated based on the time data. The consumed quantity of electric charges in the battery is measured from the operation time. The quantity of electric charges remaining in the battery is calculated from the charged quantity and consumed charge quantity. The operable time of the facsimile apparatus, the number of documents transmittable and receivable for each of the operation modes are displayed based on the current quantity of electric charges in the battery. A detector is provided which detects fall in the quantity of electric charges remaining in the battery below a predetermined value in a normal reception mode. The operation mode of the facsimile apparatus is switched from the normal reception mode to a memory reception mode based on the output from the detector.

12 Claims, 5 Drawing Sheets

FACSIMILE APPARATUS HAVING A RECHARGEABLE BATTERY

BACKGROUND OF THE INVENTION

1. Field of the Invention

The present invention relates to a portable facsimile apparatus operable by a rechargeable battery provided therein, and more particularly to such apparatus which informs an operator of the facsimile apparatus of attribute information concerning time period during which the facsimile is operable by the battery, the number of documents transmittable and the number of documents receivable on the basis of the quantity of electric charges remaining in the battery.

2. Description of the Related Art

Recently, a portable facsimile apparatus is proposed which has a rechargeable battery therein so as to be capable of transmitting and receiving a document at places where no AC power supply is available by the power fed by the battery.

In a facsimile apparatus of this kind, if the battery operation mode is selected, time available for transmission and/or reception, the number of documents transmittable and/or receivable are limited by the quantity of electric charges remaining in the battery.

However, since the facsimile apparatus of this kind has a structure in which the quantity of electric charges in the battery is detected only at the battery terminals, the state of the battery can be detected only immediately before the quantity of electric charges stored in the battery is substantially exhausted.

As discussed above, the conventional facsimile apparatus driven by a battery cannot previously supply the operator with information on how much time the apparatus can operate or how many documents it can transmit. Therefore, if the quantity of electric charges remaining in the battery is small, the voltage of the battery can abruptly fall below a predetermined value during communication, which is one of the drawbacks which degrade the reliability of the facsimile apparatus driven by a rechargeable battery.

SUMMARY OF THE INVENTION

The present invention eliminates the above drawbacks and it is an object of the present invention to provide a facsimile apparatus capable of always monitoring the current quantity of electric charges stored in the battery and of supplying the operator with information such as those concerning time period during which the apparatus is operable or the number of documents transmittable and receivable in each of the communication modes.

It is another object of the present invention to provide a facsimile apparatus capable of changing its operation mode from a normal communication mode to a memory reception mode when the quantity of electric charges stored in the battery falls below a predetermined value during reception, thereby to prolong the facsimile reception time.

In order to achieve the above objects, the present invention provides a facsimile apparatus driven by a rechargeable battery in which quantity of electric charges stored in the battery is measured from the time for which the battery is charged and discharged quantity of the battery is measured from the time for which the facsimile apparatus has been operated whereby the quantity of electric charges remaining in the battery is calculated from the measured quantity of charge of the battery and the measured quantity of discharge of the battery and the operator of the facsimile apparatus is informed of attribute data on an operable time of the facsimile apparatus in accordance with the calculated quantity of electric charges remaining in the battery.

The attribute data includes at least one of time for which a facsimile apparatus is operable, the number of documents transmittable and the number of documents receivable. If the apparatus informs the operator of the time for which the facsimile apparatus is operable, it informs him of such time corresponding to each of the operation modes of the facsimile apparatus.

According to one aspect of the present invention, the facsimile apparatus driven by a rechargeable battery comprises clock generator for generating a time data, a battery electric charge quantity monitor for calculating the charging time of the battery on the basis of the time data, measuring a quantity of electric charges stored in the battery from the time when battery started to be charged to the current time, calculating the operation time of the apparatus in each of the operation modes driven by the battery on the basis of the time data and measuring the consumed quantity of electric charges of the battery from the operation time and calculating the current quantity of electric charges remaining in the battery from the measured quantity of electric charges in the battery and the measured consumed quantity of electric charges in the battery, and an indicating unit informing the operator of attribute data on the operable time of the facsimile apparatus in each of the operation modes on the basis of the quantity of electric charges remaining in the battery calculated by the battery electric charge quantity monitor.

According to another aspect of the present invention, a facsimile apparatus driven by a battery and operable in a normal reception mode in which received image data is directly printed and output and a memory reception mode in which received image data is temporarily stored in a memory, comprises a detector for detecting a fall in the quantity of electric charges remaining in the battery below a predetermined value in the normal reception mode, and a controller for switching the operation mode of the facsimile apparatus from the normal reception mode to the memory reception mode when the detector detects a fall in the quantity of electric charges remaining in the battery below the predetermined value.

With this arrangement, when the detector detects a fall in the quantity of electric charges remaining in the battery below the predetermined value during the normal reception, the controller switches the operation mode of the apparatus from the normal reception mode to the memory reception in order to prevent interruption of the reception.

As described above, according to the inventive facsimile apparatus, the current quantity of electric charges stored in the battery is monitored at all times to display data such as data concerning time for which the apparatus is operable, the number of documents transmittable and the number of documents receivable in each of the communication modes. If the quantity of electric charges stored in the battery falls below a predetermined value during reception of facsimile, the apparatus is switched from the normal reception mode to the memory reception mode to prolong the reception time to prevent interruption of the reception.

DESCRIPTION OF THE PREFERRED EMBODIMENTS

Figure 1:
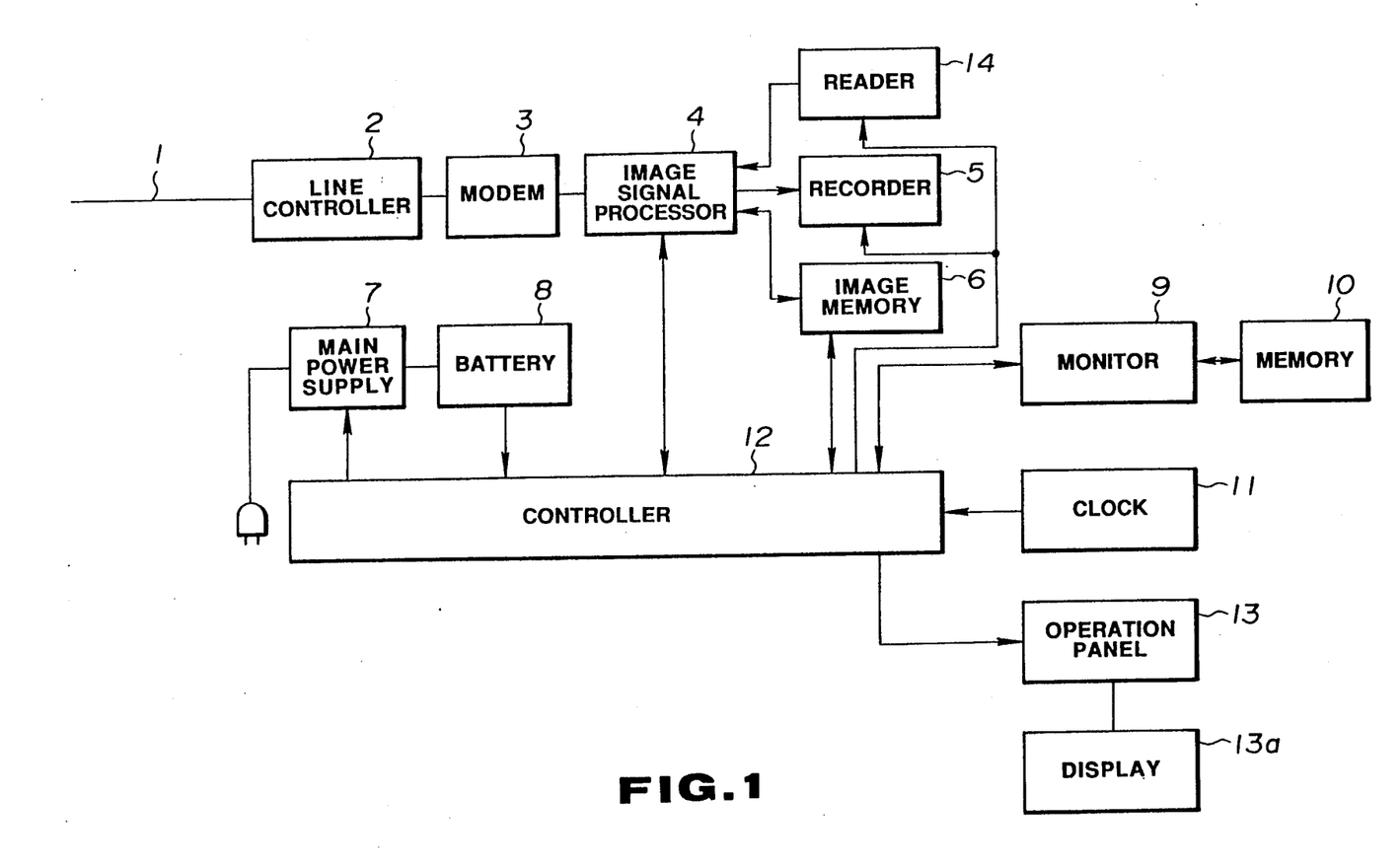
FIG. 1 is a block diagram of an embodiment of a facsimile apparatus according to the present invention.

One preferred embodiment of the present invention will be described with respect to the accompanying drawings. In FIG. 1, reference numeral 1 denotes a telephone line removably connected, for example, through modular jacks to a line controller 2 which captures/relieves the line; 3, a modem which modulates and demodulates data; 4, an image signal processor which encodes and decodes data; 5, a recorder which outputs image data by printing it on printing paper; 6, an image memory which stores image data; 7, a main power supply which converts a commercially available power supply to a predetermined power supply and supplies the apparatus with the converted power; 8, a rechargeable battery which supplies the apparatus with required electric power when main power supply 7 is unavailable; 9, a battery stored electric charge quantity monitor which monitors the quantity of electric charges stored in battery 8 and displays on a display 13a of a panel operation unit 13 the operating time of the apparatus, the number of documents transmittable and the number of documents receivable corresponding to the quantity of the electric charges when the apparatus is driven by the battery; 10, a memory which stores a table on which the quantity of electric charges in battery 8, a time for which the apparatus can be used, the number of documents transmittable and the number of documents receivable in each of the operation modes and shown in a list and data collected by battery electric charge quantity monitor 9; 11, a clock circuit which supplies data on the time to monitor 9; 12, a controller which controls the entire apparatus; 13, a panel operation unit with various operation keys and display 13a; and 14, a reader which reads a document and provides the resulting image data.

Figure 2:
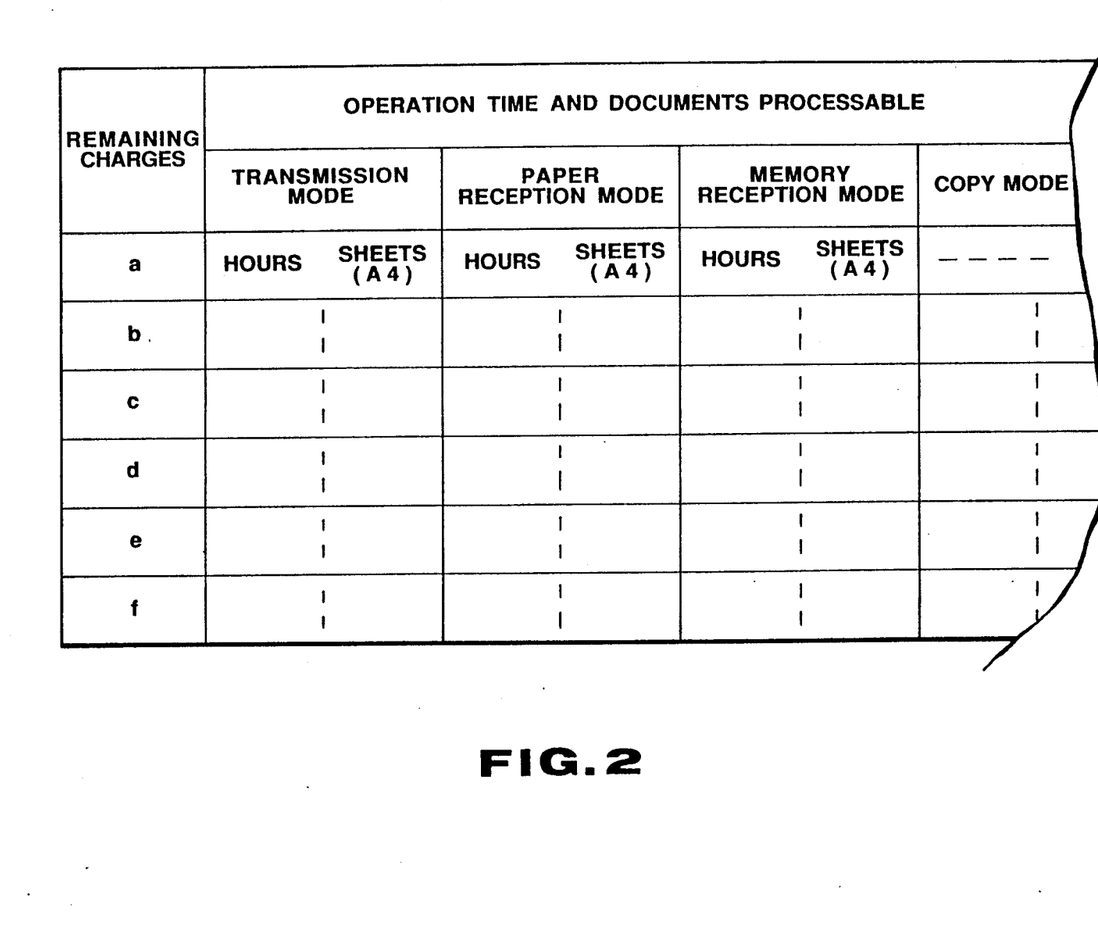
FIG. 2 illustrates a table stored in a memory of the embodiment of FIG. 1.

FIG. 2 shows one example of the table stored in memory 10 of FIG. 1. As shown in FIG. 2, the table shows in a list data on a time for which the apparatus can operate, the number of documents transmittable and the number of documents receivable in each of the operation modes in correspondence to the quantity of electric charges remaining in the battery.

In operation, controller 12 supplies power from main power supply 7 to battery 8 for charging purposes in a standby mode in which the main power supply 7 is operable and the apparatus is on. At this time, monitor 9 monitors the charge time of battery 8 on the basis of time data received from clock 11 to at all times grasp the current quantity of electric charges in battery 8 and stores the resulting data in memory 10. Controller 12 monitors the terminal voltage of battery 8. If the battery is fully charged, controller 12 stops charging from main power supply 7 and informs battery electric charge quantity monitor 9 of the fact. Thus, monitor 9 grasps the current quantity of electric charges in battery 8 at all times.

In transmission, the image data on a document read by reader 14 is encoded by image signal processor 4, modulated by modem 3 and sent through line controller 2 to telephone line 1.

In the normal reception, data on telephone line 1 is input through line controller 2 to modem 3 where the data is demodulated and input to image signal processor 4, which demodulates the received data and delivers the resulting data to recorder 5. Recorder 5 outputs the received data by printing it on paper.

In the memory reception, the encoded data input to image signal processor 4 is temporarily stored in image memory 6. Thereafter, data is read from image memory 6 in accordance with an operator's instruction from panel operation unit 13. The data is demodulated by picture signal processor 4 and delivered to recorder 5 to output the received data.

When line 1 is connected through the modular jacks to line controller 2 and the power supply for the apparatus is turned on to use the facsimile apparatus in a place where main power supply 7 is unavailable, controller 12 switches the circuit so as to supply power from battery 8 to the apparatus and informs battery electric charge quantity monitor 9 of the fact. At this time, monitor 9 refers to the table of FIG. 2 in memory 10 and reads data on a time for which the apparatus can be used, the number of documents transmittable the number of documents receivable in each of the operation modes on the basis of data on the quantity of electric charges stored in battery 8 and stored at that time in memory 10 and displays data on display 13a of panel operation unit 13 through controller 12.

The operator determines the number of documents to be transmitted from data on the time for which the apparatus is operable, the number of documents transmittable and the number of documents receivable and displayed on display 13a, or he selects one of the memory reception mode in which the received data is temporarily stored in image memory 6 and the normal reception mode in which recorder 5 is used, when reception is to be made.

When the operator operates the apparatus by determining the operation mode of the apparatus, monitor 9 calculates a time for which battery 8 is used in each of the operation modes on the basis of time data received from clock 11 and calculates the remaining quantity of electric charges in battery 8 on the basis of the data on the time. Thus, monitor 9 grasps the current quantity of electric charges in battery 8 and stores its data in memory 10.

Therefore, if the operator wants to receive image data by changing the apparatus operation to the reception mode after the apparatus is operated in the transmission mode, he keys in a command to indicate the operation time of the apparatus from panel operation unit 13 to controller 12. In response to this, controller 12 fetches data on the time for which the apparatus is operable, data on the number of documents transmittable, and data on the number of documents receivable, in each of the operation modes as mentioned above, from memory 10 of battery electric charge quantity monitor 9 and causes panel operation unit display 13a to display the data.

Thus, for example, if the number of documents to be received is large in spite of a short receivable time, the operator puts the apparatus in the memory reception mode to cause the received image data to be temporarily stored in image memory 6. Thereafter, when main power supply 7 becomes available, the operator selects the procedures of reading the image data stored in image memory 6 and outputting the data through recorder 5.

If the time for which the apparatus can receive data is long or the number of documents to be received is small, the operator selects a mode in which the received image data is directly delivered to recorder 5 and output from same to improve the reliability of the apparatus during battery driving.

When the apparatus has operated in the normal reception mode in which the received image data is directly output from recorder 5 and controller 12 recognizes that the quantity of electric charges in battery 8 has fallen below a predetermined value on the basis of data from monitor 9, controller 12 automatically switches the apparatus operation into the memory reception mode in which the received image data is temporarily stored in image memory 6 to prolong the receivable time. Whether controller 12 provides such control is determined depending on whether the operator beforehand selects and sets the above control through panel operation unit 13.

Controller 12 monitors the terminal voltage of battery 8 in a conventional manner. When it determines that the quantity of electric charges in battery 8 becomes substantially drained and hence that the apparatus cannot continue to operate any longer, it displays the fact on panel operation unit display 13a or generates an alarm sound through panel operation unit 13.

The operation of the embodiment will be further described with reference to the flowcharts of FIGS. 3 and 4.

Figure 3:
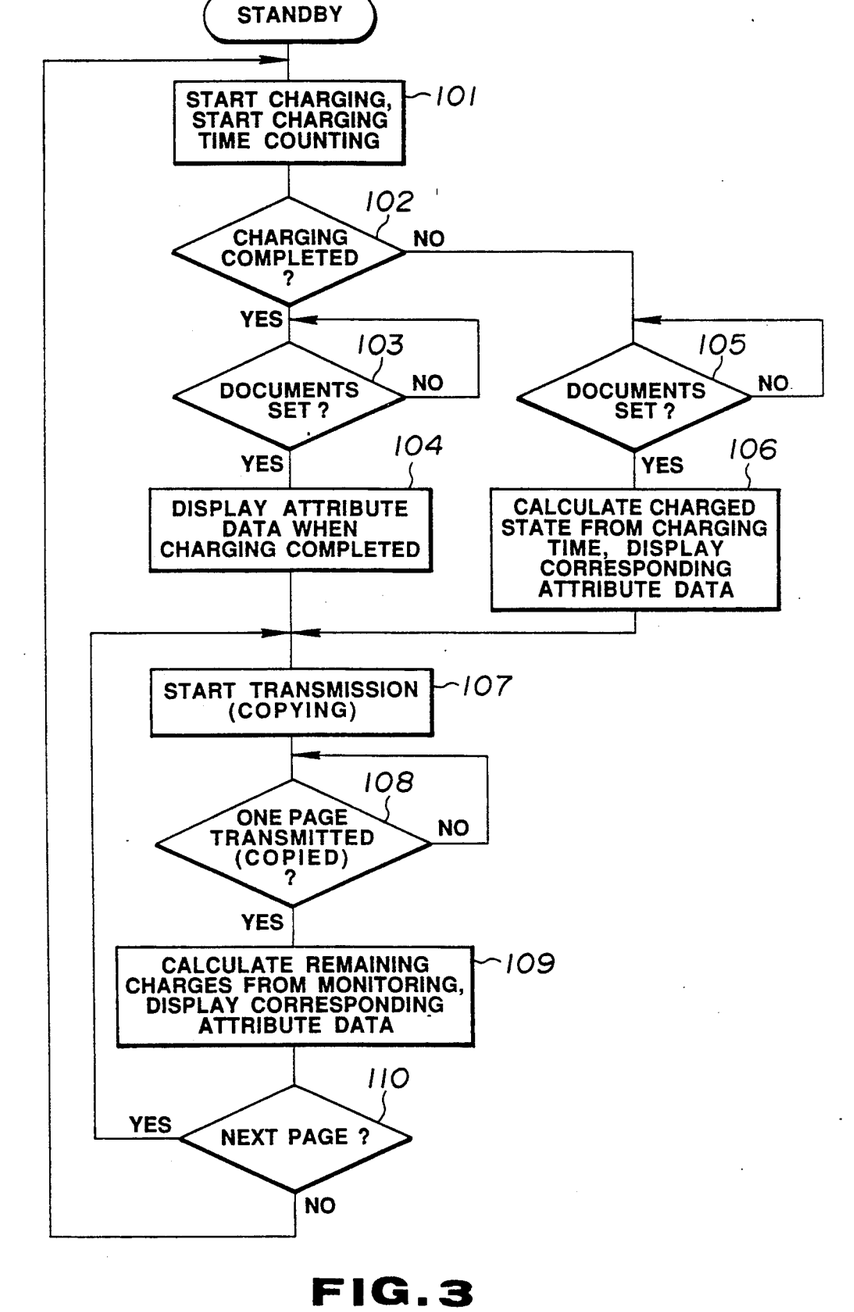
FIG. 3 is a flowchart illustrating the operation of the embodiment of FIG. 1 during transmission.

FIG. 3 shows the transmitting or copying operation of the embodiment. In the state where the main power supply 7 is connected to an AC power supply, it starts to charge battery 8. When controller 12 detects such charging, monitor 9 starts to count the charging time in accordance with the time in clock 11 (step 101). Controller 12 also monitors the terminal voltage of battery 8. When it detects the battery 8 fully charged, it stops charging from main power supply 7 by regarding battery 8 as being fully charged (step 102) and informs monitor 9 of the fact.

Under such conditions, when main power supply 7 is disconnected from the AC power supply, the operation mode involving power supply from battery 8 starts. When documents to be transmitted are set (step 103), monitor 9 fetches from memory 10 data on an operable time, data on the number of documents transmittable and data on the number of documents receivable in each operation mode. Controller 12 displays on display 13a those data entities from monitor 9 as attribute data in the state where the charging has completed (step 104).

The operator watches the display of the attribute data and selects an approximate mode to start a transmitting or copying operation (step 107). When transmission or copying of one page of the document is completed (step 108), monitor 9 calculates the quantity of electric charges remaining in battery 8 from the result of monitoring the real apparatus operation, updates the attribute data stored in memory 10 with the calculated data, and displays the updated attribute data on display 13a (step 109).

The controller checks whether there is the next page of the documents to be transmitted (step 110). If so, control returns to step 107 to start to transmit or copy the next page and iterates this operation until the controller determines that there is no next page remaining. At step 110 if the controller determines that there is no next page to be transmitted, control returns to step 101 for standby purposes.

At step 102 when main power supply 7 is disconnected from the AC power supply and the operation mode involving power feed from battery 8 is employed before the completion of charging is determined and documents to be transmitted are set (step 105), monitor 9 fetches from memory 10 attribute data including data on an operable time of the apparatus, and data on the number of documents transmittable and the number of documents receivable in each of the operation modes in the current state of charging of the battery and calculated from the charging time and displays the attribute data on display 13a (step 106) and control then passes to step 107. The operator watches the attribute data, select an appropriate mode and starts the transmitting or copying operation. The subsequent operations are similar to those mentioned above.

Figure 4:
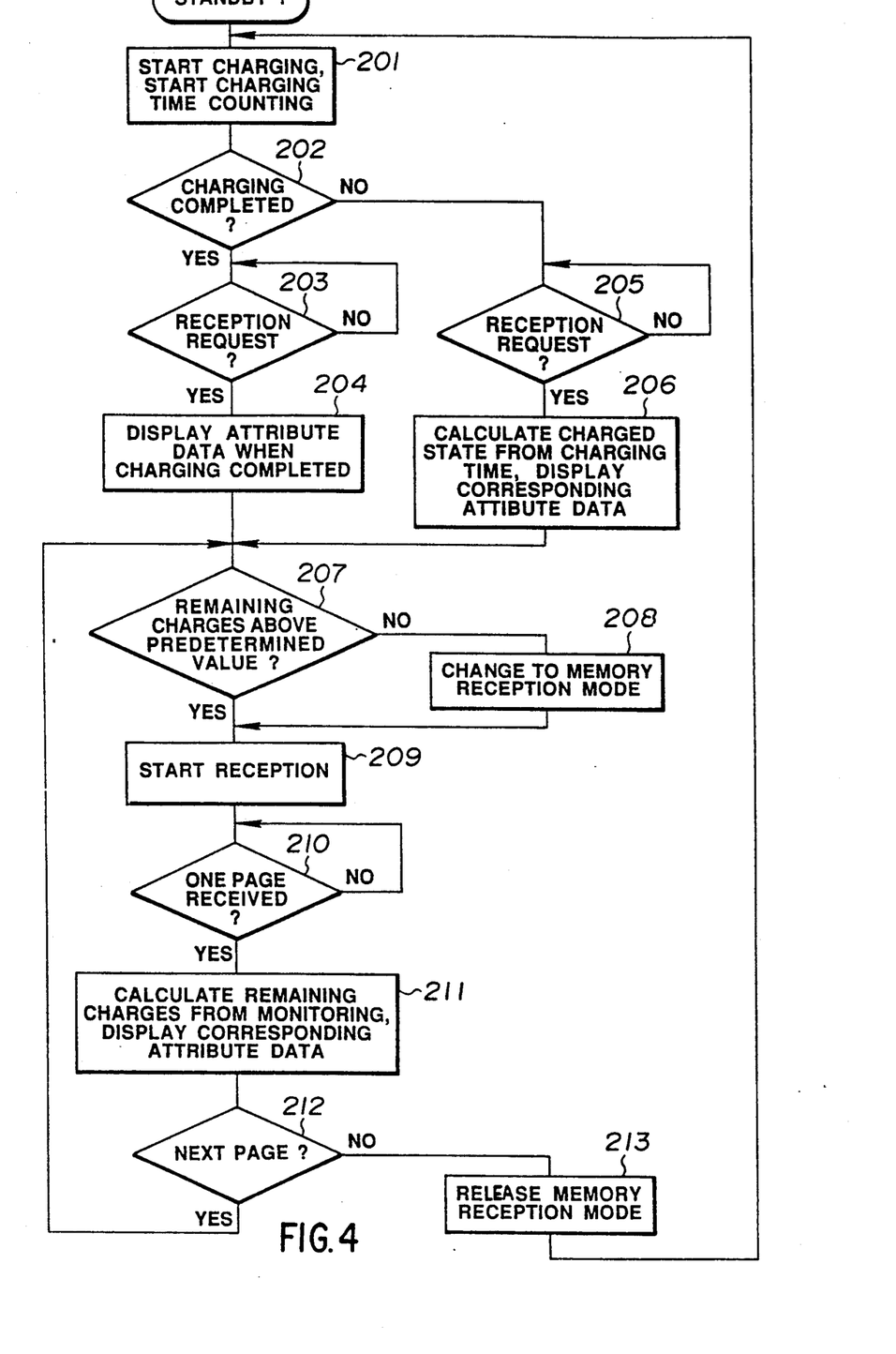
FIG. 4 is a flowchart illustrating the operation of the embodiment during reception.

FIG. 4 shows the receiving operation of the embodiment. When main power supply 7 starts to charge battery 8 in the state of main power supply 7 being connected to the AC power supply and controller 12 detects this charging, monitor starts to count the charging time on the basis of time data from clock 11 (step 201). Controller 12 monitors the terminal voltage of battery 8. When it detects battery 8 fully charged, it stops charging from main power supply 7 by regarding the battery as being fully charged (step 202) and informs monitor 9 of this fact.

Under such condition, when (1) main power supply 7 is disconnected from the AC power supply, (2) the operation mode involving power supply from battery 8 is selected and (3) a request for reception is made (203), monitor 9 fetches data on a operable time, data on the number of documents transmittable and data on the number of documents receivable in each of the operation modes. Controller 12 displays on display 13a the data from monitor 9 as attribute data in the state of completed charging (step 204).

The controller checks whether the quantity of electric charges remaining in battery 8 is below the predetermined value (step 207). If not, it starts reception (step 109). If the quantity of electric charges remaining in battery 8 is below the predetermined value, the controller selects the memory reception mode in which image data on the received documents is temporarily stored in the image memory (step 208).

When the reception of one page of the document is completed (step 210), monitor 9 calculates the quantity of electric charges remaining in battery 8 from the result of the real operation of the apparatus, updates the attribute data stored in memory 10 with the calculated data, and displays the updated attribute data on display 13a (Step 211).

Next, the controller checks whether there is the next page of the received documents (step 212). If so, control returns to step 207 where the controller checks whether the quantity of electric charges remaining in battery 8 is below the predetermined value (step 207). The controller iterates this operation until it determines that there is no next page at step 212. If the controller determines that there is not next page at step 212, it releases the memory reception mode if same is already selected (Step 213) and control returns to step 201 for standby purposes.

At step 202 if (1) main power supply 7 is disconnected from the AC power supply before the determination of completed charging is made, (2) the operation mode involving power supply from battery 8 is employed and (3) a request for reception is made (step 205), monitor 9 fetches from memory 10 attribute data including data on a operable time of the apparatus, data on the number of documents transmittable and data on the number of documents receivable in each of the operation modes in the current state of charging calculated from the charging time of the battery, displays the data on display 13a (step 206) and control then passes to step 207. The subsequent operation is similar to that mentioned above.

As mentioned above, according to the embodiment, monitor 9 always grasps the quantity of electric charges in battery 8, so that when the apparatus is driven by the battery, monitor 9 can inform the operator of an operable time of the apparatus, the number of documents transmittable and the number of documents receivable in each of the operation modes on the basis of the current quantity of electric charges in battery 8. Therefore, operator can select the optimal reception mode on the basis of the displayed data. If the transmission mode is selected, he can transmits data entities with priorities. In addition, an undesirable situation is avoided in which the power of battery 8 would be drained during the operation of the apparatus to thereby interrupt telephonic communication.

When the quantity of electric charges remaining in battery 8 falls below the predetermined value, controller 12 automatically causes the apparatus to be put in the memory reception mode to prolong the operation time of the apparatus on the basis of the data from monitor 9 during reception to thereby avoid interruption of the communication and hence improve the reliability of the apparatus.

while in the above embodiment the telephone line 1 is shown as being directly connected through the modular jacks to line controller 2, the facsimile apparatus and telephone line 1 may be connected by radio so as to provide a cordless facsimile apparatus.

Figure 5:
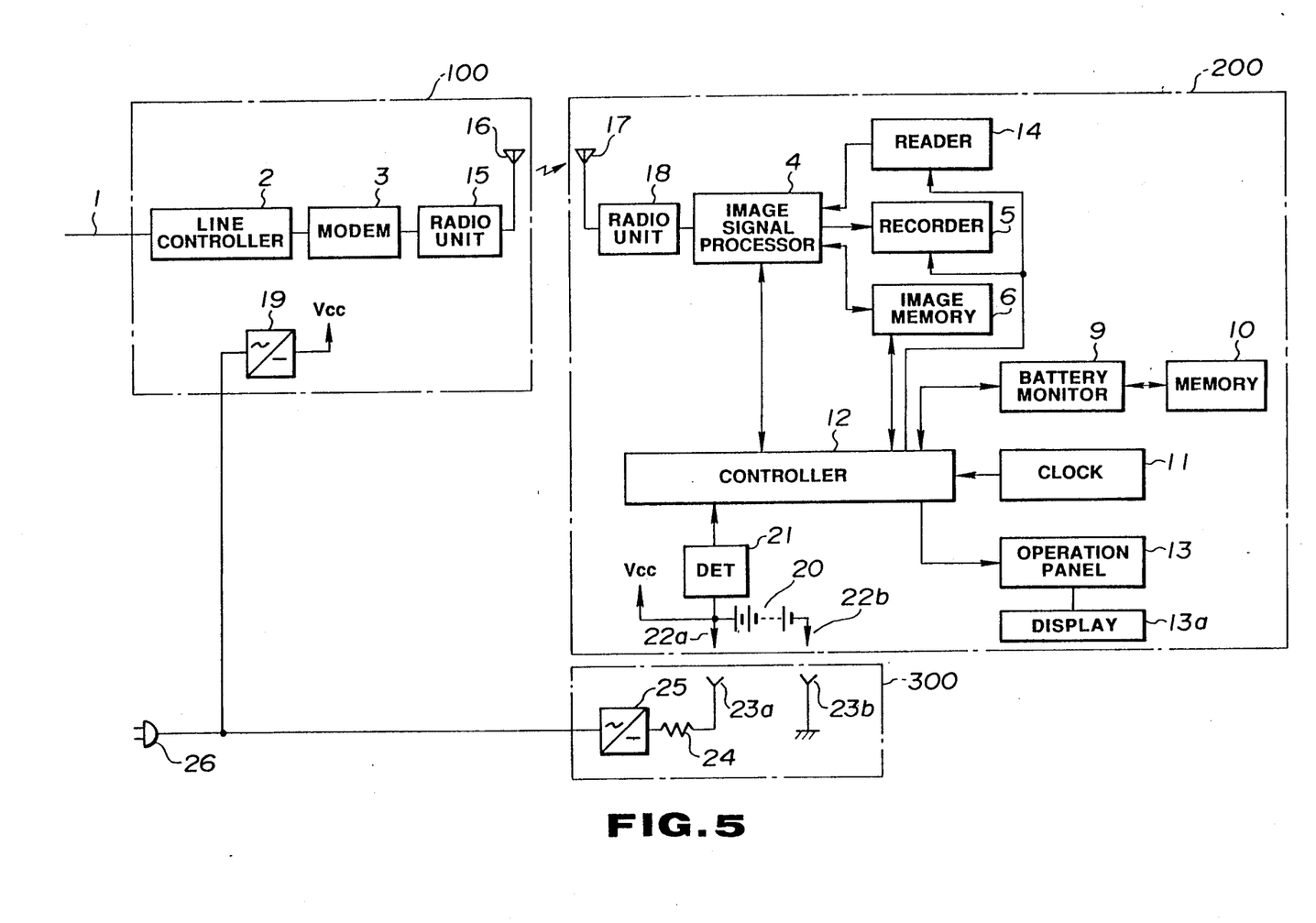
FIG. 5 is a block diagram of another embodiment of the facsimile apparatus according to the present invention which is constructed as a cordless facsimile apparatus.

FIG. 5 shows another embodiment of the present invention directed to such structure. This embodiment includes a connection unit 100, a cordless facsimile apparatus 200 which is connected by radio to connection unit 100, a charging unit 300 which charges a battery 20 for facsimiles apparatus 200.

In the embodiment of FIG. 5, an element having the same function as that of the FIG. 1 embodiment is given the same reference numeral as that element of the FIG. 1 embodiment for convenience of explanation.

In this embodiment, connection unit 100 includes a line controller 2 connected to telephone line 1, a modem 3, a radio unit 15, an antenna 16, and a rectifier 19. Cordless facsimile apparatus 200 includes an antenna 17, a radio unit 18, an image signal processor 4, a recorder 5, an image memory 6, a reader 14, recorder 5, a battery electric charge quantity monitor 9, a memory 10, a clock 11, a display 13a, a controller 12, a battery 20, and a detector 21. Charging unit 300 includes a rectifier 25, and a current limiting resistor 24. Rectifiers 19 and 25 of connection unit 100 and charging unit 300 are connected to a plug 26 to which an AC power supply is applied so as to constitute the corresponding power supply circuits.

Radio unit 15 and antenna 16 of connection unit 100 and antenna unit 17 and radio unit 18 of cordless facsimile apparatus 200 are newly introduced into this embodiment in order to connect connection unit 100 and cordless facsimile apparatus 200 by radio. Connection of connection unit 100 and cordless facsimile apparatus 200 through radio is made, for example, in a well-known multi-channel access system.

By placing cordless facsimile apparatus 200 on charging unit 300, contacts 22a, 22b of facsimile apparatus 200 are connected correspondingly to contacts 23a, 23b of charging unit 300, so that battery 20 of facsimile apparatus 200 is charged by the output of rectifier 25 of charging unit 300.

The operation of this embodiment is substantially same as that of the FIG. 1 embodiment except that connection unit 100 and facsimile apparatus 200 are connected by radio, and that facsimile apparatus 200 and charging unit 300 are connected through contacts 22a, 22b and contacts 23a, 23b.

By such arrangement, facsimile apparatus 200 has a completely cordless structure with reference to telephone line 1 and the power supply, so that its operability and portability is improved.

While any of the above embodiments uses the time output from clock 11 to detect the quantities of charge and discharge in the battery, an arrangement may be used in which the quantities of charge and discharge in the battery are detected from the counted time in a timer.

What is claimed is:

1. A facsimile apparatus driven by a rechargeable battery, comprising:
    charged quantity measuring means for measuring a charged quantity of the battery by measuring time for which the battery is charged;
    discharged quantity measuring means for measuring a discharged quantity of the battery by measuring time for which said facsimile apparatus has been operated;
    calculating means for calculating the quantity of electric charges remaining in the battery from the charged quantity of the battery measured by said charged quantity measuring means and the discharged quantity of the battery measured by said discharged quantity measuring means; and
    means for informing a facsimile operator of an attribute data concerning an operable time of the facsimile apparatus driven by the battery in accordance with the quantity of electric charges remaining in the battery calculated by said calculating means,
    wherein said facsimile apparatus is operable in a plurality of operation modes and said discharged quantity measuring means measures the discharged quantity of the battery in correspondence to the operation modes of the facsimile apparatus.

2. A facsimile apparatus according to claim 1, wherein said informing means informs the operator of an operable time of the facsimile apparatus as the attribute data.

3. A facsimile apparatus driven by a rechargeable battery, comprising:
    charged quantity measuring means for measuring a charged quantity of the battery by measuring time for which the battery is charged;

discharged quantity measuring means for measuring a discharged quantity of the battery by measuring time for which said facsimile apparatus has been operated;

calculating means for calculating the quantity of electric charges remaining in the battery from the charged quantity of the battery measured by said charged quantity measuring means and the discharged quantity of the battery measured by said discharged quantity measuring means; and means for informing a facsimile operator of an attribute data concerning an operable time of the facsimile apparatus driven by the battery in accordance with the quantity of electric charges remaining in the battery calculated by said calculating means, wherein said informing means informs the operator of the number of documents transmittable by the facsimile apparatus as the attribute data.

4. A facsimile apparatus driven by a rechargeable battery, comprising:

charged quantity measuring means for measuring a charged quantity of the battery by measuring time for which the battery is charged;

discharged quantity measuring means for measuring a discharged quantity of the battery by measuring time for which said facsimile apparatus has been operated;

calculating means for calculating the quantity of electric charges remaining in the battery from the charged quantity of the battery measured by said charged quantity measuring means and the discharged quantity of the battery measured by said discharged quantity measuring means; and means for informing a facsimile operator of an attribute data concerning an operable time of the facsimile apparatus driven by the battery in accordance with the quantity of electric charges remaining in the battery calculated by said calculating means, wherein said informing means informs the operator of the number of documents receivable by the facsimile apparatus as the attribute data.

5. A facsimile apparatus driven by a rechargeable battery, comprising:

charged quantity measuring means for measuring a charged quantity of the battery by measuring time for which the battery is charged;

discharged quantity measuring means for measuring a discharged quantity of the battery by measuring time for which said facsimile apparatus has been operated;

calculating means for calculating the quantity of electric charges remaining in the battery from the charged quantity of the battery measured by said charged quantity measuring means and the discharged quantity of the battery measured by said discharged quantity measuring means; and means for informing a facsimile operator of an attribute data concerning an operable time of the facsimile apparatus driven by the battery in accordance with the quantity of electric charges remaining in the battery calculated by said calculating means, wherein said facsimile apparatus is operated in a plurality of operation modes and said informing means informs the operator of the attribute data in correspondence to the operation modes of the facsimile apparatus.

6. A facsimile apparatus driven by a rechargeable battery, comprising:

charged quantity measuring means for measuring a charged quantity of the battery by measuring time for which the battery is charged;

discharged quantity measuring means for measuring a discharged quantity of the battery by measuring time for which said facsimile apparatus has been operated;

calculating means for calculating the quantity of electric charges remaining in the battery from the charged quantity of the battery measured by said charged quantity measuring means and the discharged quantity of the battery measured by said discharged quantity measuring means; and means for informing a facsimile operator of an attribute data concerning an operable time of the facsimile apparatus driven by the battery in accordance with the quantity of electric charges remaining in the battery calculated by said calculating means, wherein said informing means informs the operator of an operable time of the facsimile apparatus, the number of documents transmittable, and the number of documents receivable as the attribute data.

7. A facsimile apparatus driven by a rechargeable battery and operable in a plurality of operation modes, comprising:

means for generating time data;

charged quantity measuring means for calculating the charging time of the battery on the basis of the time data, and measuring a quantity of electric charges stored in the battery from the time when battery started to be charged to the current time;

consumed quantity measuring means for calculating operation time of the apparatus driven by the battery in each of the operation modes on the basis of the time data and measuring the consumed quantity of electric charges in the battery from the operation time;

calculating means for calculating current quantity of electric charges remaining in the battery from the quantity measured by said charged quantity measuring means and the quantity measured by said consumed quantity measuring means; and means for informing a facsimile operator of attribute data concerning operable time of the facsimile apparatus in each of the operation modes on the basis of the quantity of electric charges remaining in the battery calculated by said calculating means.

8. A facsimile apparatus according to claims 7, wherein said facsimile apparatus is operable in reception modes including a normal reception mode in which a first received image is directly printed and output on paper and a memory reception mode in which a second received image is temporarily stored in a memory and said facsimile apparatus further comprises:

means for detecting that the quantity of electric charges remaining in the battery falls below a predetermined value; and means for switching the reception mode from the normal reception mode to the memory reception mode.

9. A facsimile apparatus according to claim 7, wherein said informing means informs the operator of an operable time of the facsimile apparatus as the attribute data.

10. A facsimile apparatus according to claim 7, wherein said informing means informs the operator of the number of documents transmittable by the facsimile apparatus as the attribute data.

11. A facsimile apparatus according to claim 7, wherein said informing means informs the operator of the number of documents receivable by the facsimile apparatus as the attribute data.

12. A facsimile apparatus according to claim 7, wherein said informing means informs the operator of an operable time of the facsimile apparatus, the number of documents transmittable, and the number of documents receivable as the attribute data.

* * * * *